B. E. TAYLOR.
LIQUID MEASURING AND CONTAINER CHARGING MACHINE.
APPLICATION FILED JULY 20, 1916.
1,246,180.
Patented Nov. 13, 1917.
8 SHEETS—SHEET 4.
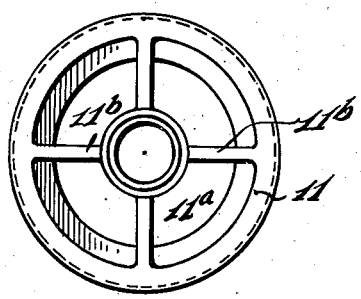
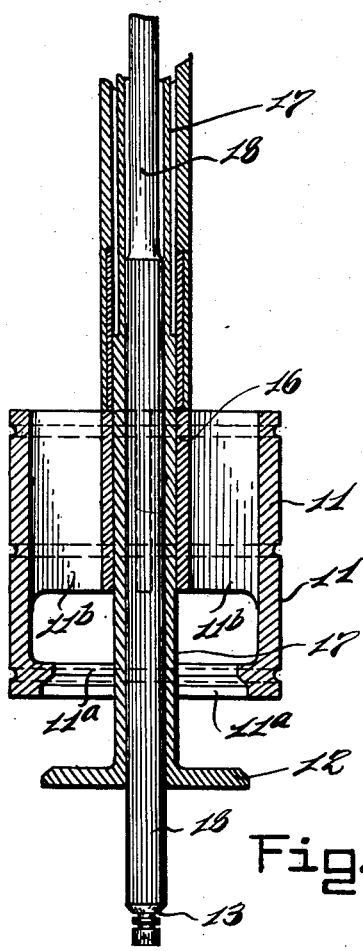
Fig.9.
Fig.8.
Fig.11.
Fig.10.
Inventor
Burt E. Taylor
By
Attorney

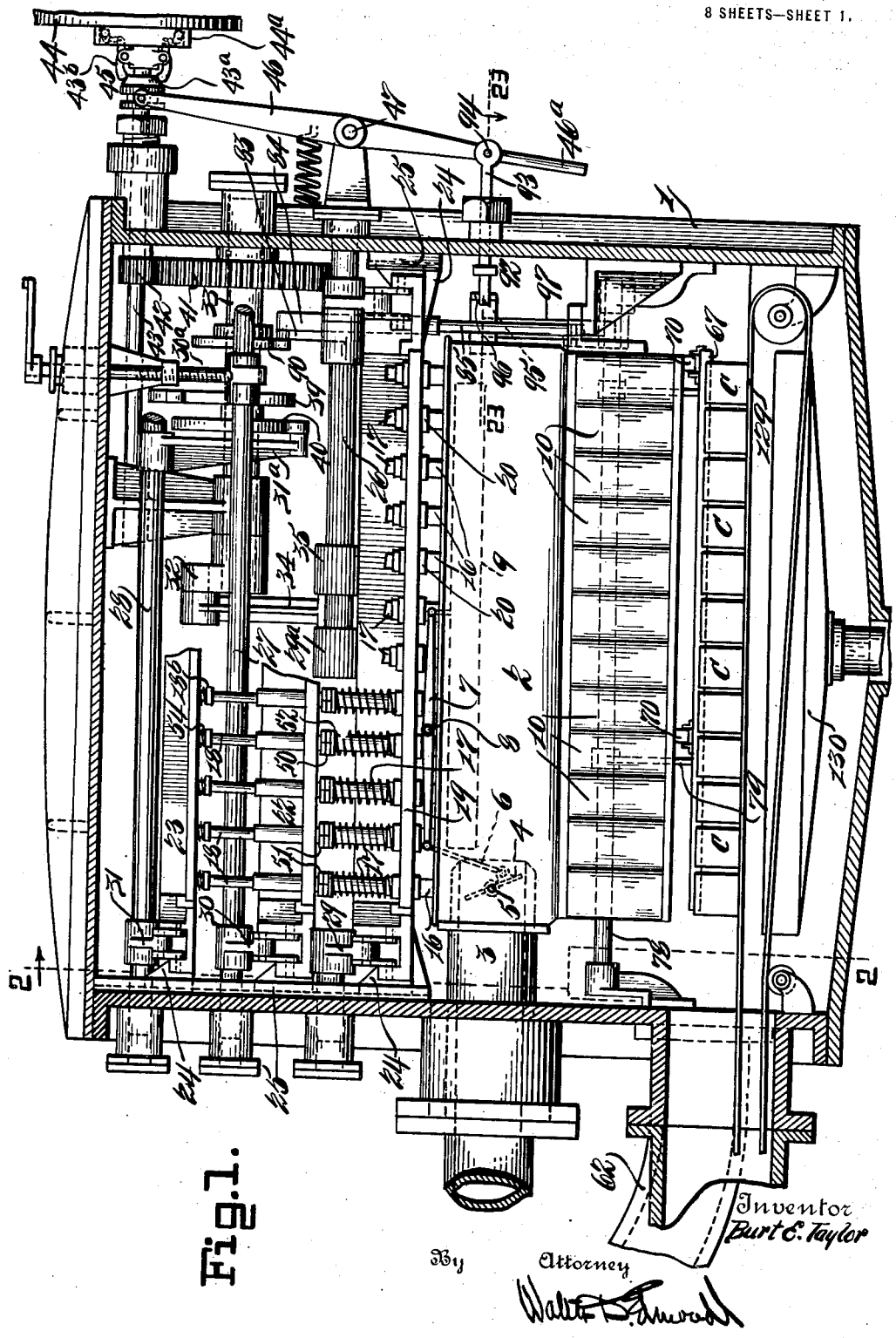

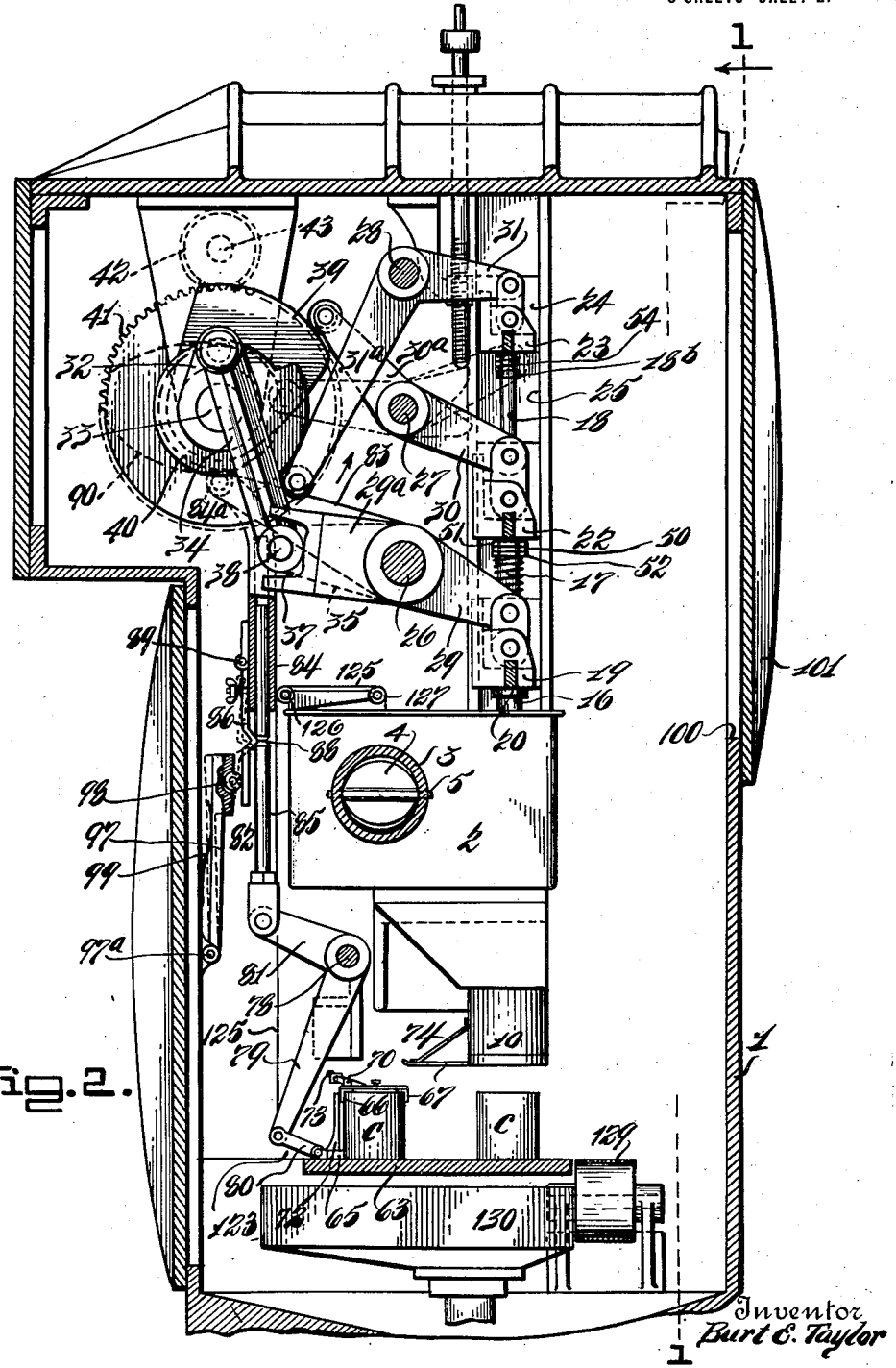

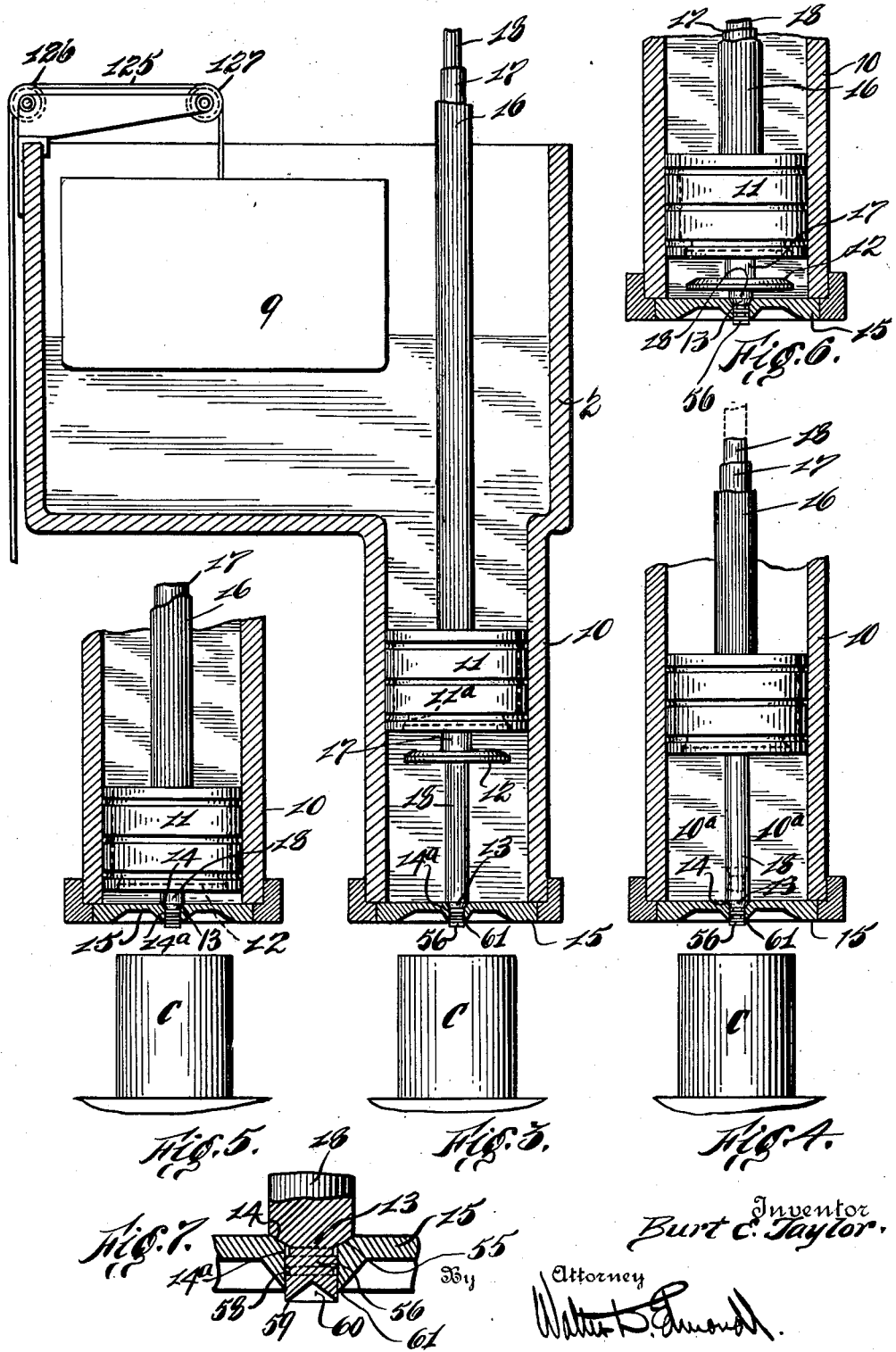

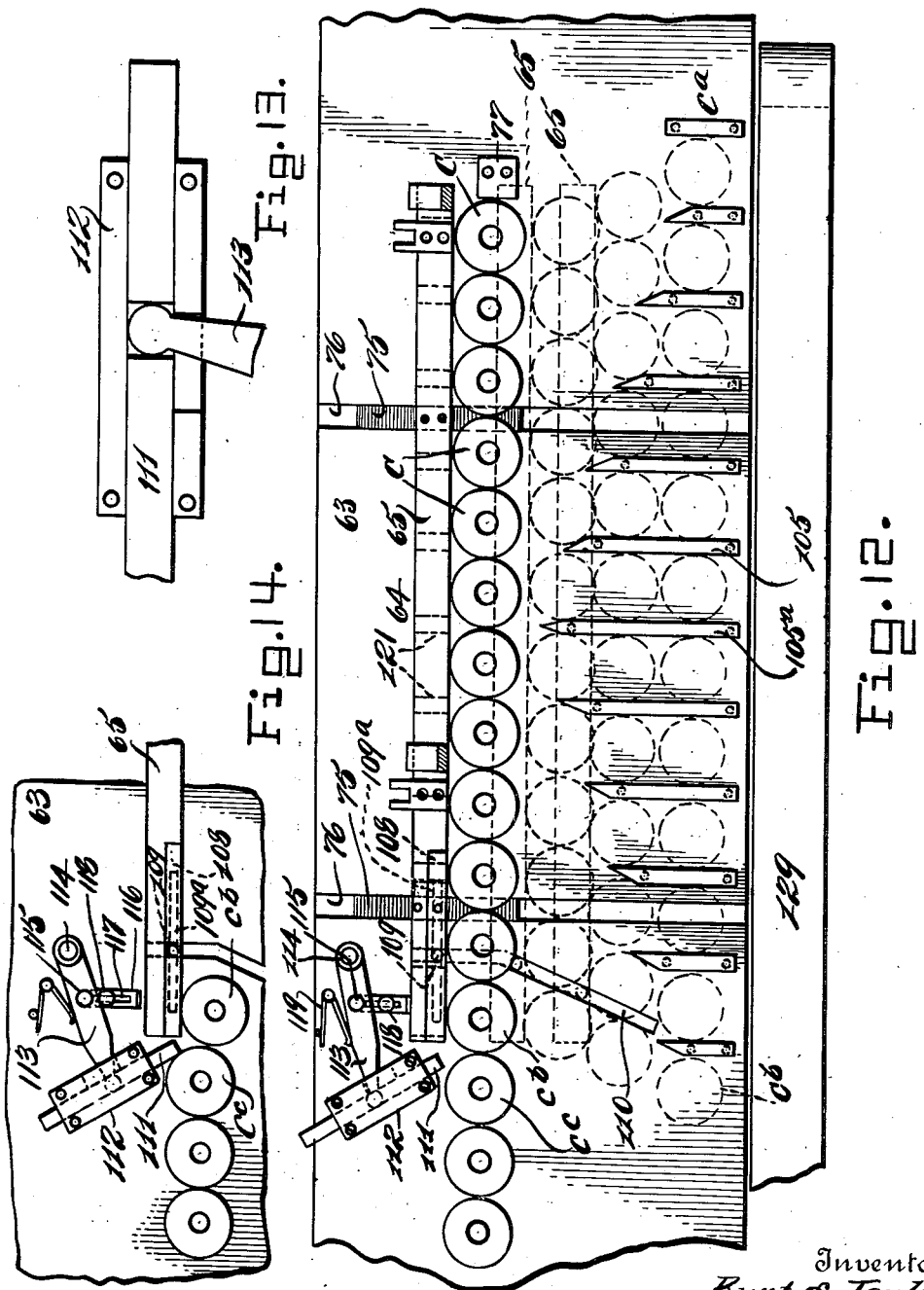

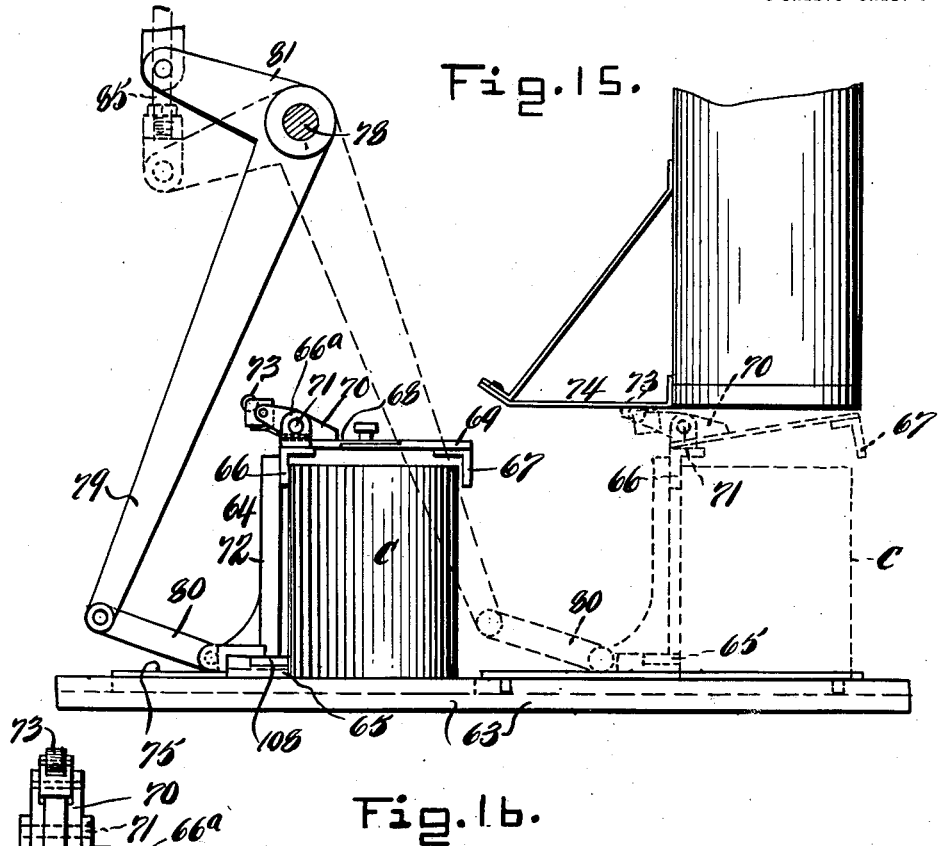
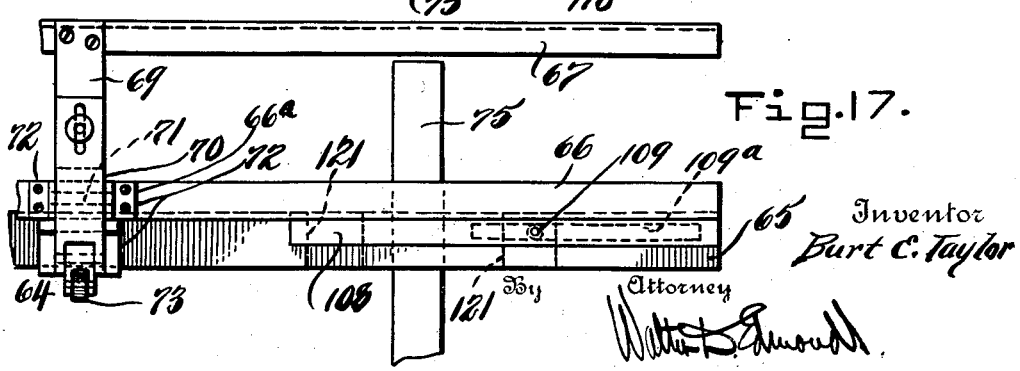

B. E. TAYLOR.
LIQUID MEASURING AND CONTAINER CHARGING MACHINE.
APPLICATION FILED JULY 20, 1916.
1,246,180.
Patented Nov. 13, 1917.
8 SHEETS—SHEET 7.
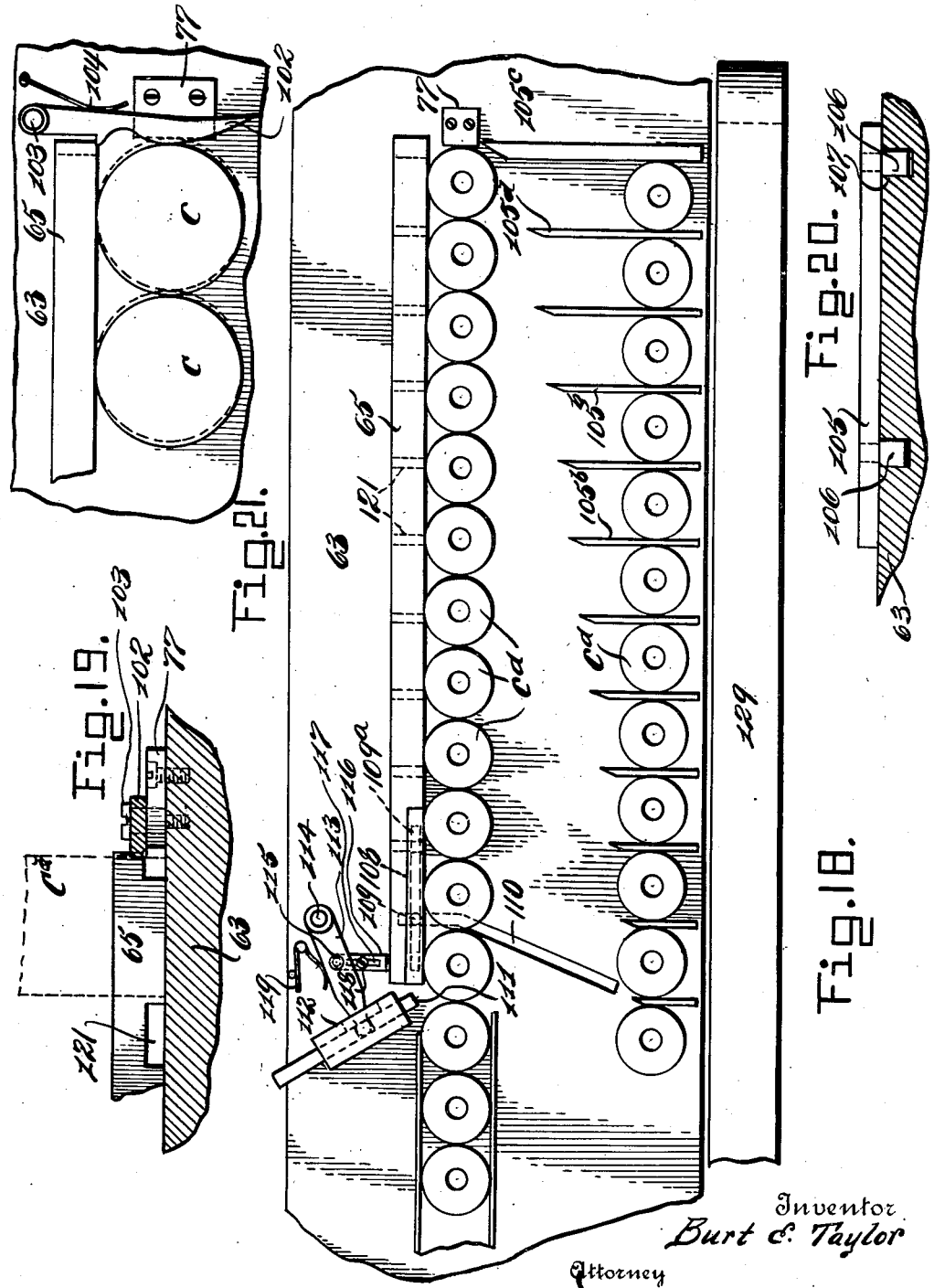
Inventor
Burt E. Taylor
Attorney B. E. TAYLOR.
LIQUID MEASURING AND CONTAINER CHARGING MACHINE.
APPLICATION FILED JULY 20, 1916.

1,246,180.

Patented Nov. 13, 1917.
8 SHEETS—SHEET 8.

Inventor
Burt E. Taylor.

By Attorney

UNITED STATES PATENT OFFICE.

BURT E. TAYLOR, OF MOUNT VERNON, NEW YORK, ASSIGNOR TO BORDEN'S CONDENSED MILK COMPANY, OF NEW YORK, N. Y., A CORPORATION OF NEW JERSEY.

LIQUID-MEASURING AND CONTAINER-CHARGING MACHINE.

1,246,180.  Specification of Letters Patent.  Patented Nov. 13, 1917.

Application filed July 20, 1916. Serial No. 110,395.

*To all whom it may concern:*

Be it known that I, BURT E. TAYLOR, a citizen of the United States, and a resident of Mount Vernon, in the county of Westchester, State of New York, have invented a certain new and useful Liquid - Measuring and Container-Charging Machine, of which the following is a specification.

My present invention relates to improvements in machines designed to automatically measure and separate from a body of liquid a predetermined portion thereof and to charge the same into containers, such as cans, and it is especially useful in thus treating milk, or other liquid, or semi-liquid, products which are sensitive to contamination or infection from their contact with malign or undesired substances or organisms.

The objects of my invention comprise provision of such measuring, separating, and container-charging, instrumentalities as shall be disposed, and function, constantly, and altogether, in submergence within the liquid, thus thereby excluding all of their liquid-manipulating surfaces from direct contact with the atmosphere during operation; also the imparting to such instrumentalities and their actuating connections of novel constructions and modes of operation, whereby greater precision, speed, and compactness than heretofore are attainable, less power is required, and hitherto employed packings, joints, piston-rods, cylinder-ends, sliding cut-offs, etc., capable of undesirably retaining, and exposing, thereto adhering portions of the liquid, or milk, are dispensed with. My invention also comprises such construction of my said novel instrumentalities as to insure their workability under reduced atmospheric pressures, or even in a substantial vacuum, which is sometimes desirable to further prevent contaminations of certain peculiarly sensitive liquids, or semi-liquids. And my invention further includes, in an organized machine, the provision of means whereby, automatically, a plurality of like charges can, from the same body of liquid, be simultaneously separated and measured, as aforesaid, and thereafter delivered simultaneously into a like plurality of like containers, automatically moved in time to and from the positions required therefor; also means, controlled by the liquid, to regulate its supply to said body thereof proportionately to the volume of the latter required for proper operation; also means controlled by the, as yet uncharged containers, or by the liquid, whereby the operation of the machine is arrested during occurrence of undesired abnormal conditions such as interruptions in supply of liquid, or of containers, or the jamming of the latter, etc.

I attain these objects by the mechanisms illustrated in the accompanying drawings, in which Figure 1 is a vertical section of the entire machine taken on the line 1—1 of Fig. 2, some parts being broken away.

Fig. 2 is a similar vertical section on the line 2—2 of Fig. 1.

Fig. 3 is a central-vertical-sectional detail view, on enlarged scale, including my reservoir, and therewith communicating cylindrical receptacle and the outlet valve of latter closed, and also my piston and piston valve in their uppermost position in said receptacle, an unfilled container being diagrammatically indicated below them.

Figs. 4, 5, and 6, are fragmentary central-vertical-sectional views illustrating my said receptacle, piston, and valves, in some of their various relative positions during operation.

Fig. 7 is a detail view on still more enlarged scale showing a central vertical section of the outlet of the said receptacle through which the measured liquid is forced into the container and of my valves coöperating with said outlet.

Fig. 8 is a detail view, on a scale larger than Figs. 4, 5, and 6, showing an elevation of the valve shown in Fig. 7, and of its connecting rod, and a central vertical section of my piston and its valve, and of the spindles by which they are respectively connected with their actuating means not shown.

Fig. 9 is a top plan view of Fig. 8.

Fig. 10 is an enlarged detail view partly in section and partly in elevation, further showing the relative arrangements of, and connections with, said spindles, rod, etc.

Fig. 11 is a fragmentary plan view of one of the bars supporting the spindles.

Fig. 12 is a diagrammatic plan of the table of my machine illustrating the manner of simultaneously moving the containers toward and centering them relatively to the outlets of my cylindrical receptacles.

Fig. 13 is, on greatly enlarged scale, an underneath plan view showing the manner of connecting the movable container-stop with its operating lever.

Fig. 14 is a fragmentary diagrammatic view to further illustrate the construction of the container-stop and some of its actuating connections.

Fig. 15 is a fragmentary, enlarged, diagrammatic view indicating some of my container-positioning and moving devices, including particularly the pusher-bar and its action.

Fig. 16 is a diagrammatic fragmentary front elevation of one end of the rack which is part of my container-positioning means.

Fig. 17 is a plan view of Fig. 16.

Fig. 18 is a diagrammatic plan illustrating means for positioning containers larger than those shown in Fig. 12.

Fig. 19 is, on enlarged scale, a fragmentary detail view partly in section showing the tripping device for locking the said pusher-bar.

Fig. 20 is a diagrammatic detail illustrating one of my movable container-guiding rails, and its manner of connection with the table of the machine.

Fig. 21 is a diagrammatic fragmentary plan view showing the tripping device for locking the pusher-bar indicated in Fig. 19.

Figure 22:
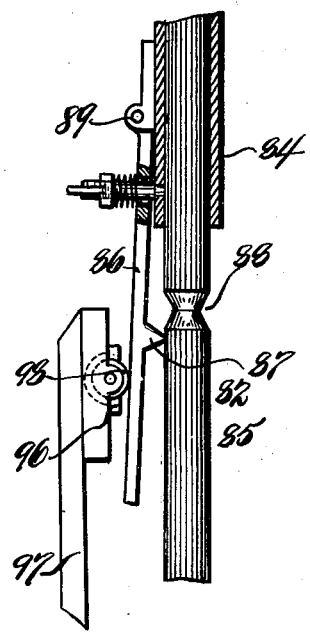

Fig. 22 is, on an enlarged scale, a fragmentary elevation, partly in section, of my two-part link comprised in the connections between the pusher-bar and its actuating means, and also of the releasable latch whereby the parts of the link are operatively connected, and of the movable spring-tensioned block by aid of which displacement of said latch is transmitted to stop the machine.

Figure 23:
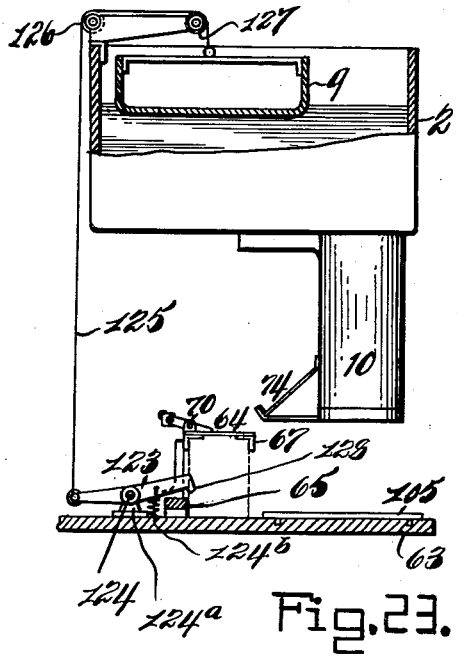

Fig. 23 is a diagrammatic detail view, partly in vertical section, illustrating my means for arresting the movement of the pusher-bar when the supply of liquid in the reservoir becomes insufficient.

Figure 24:
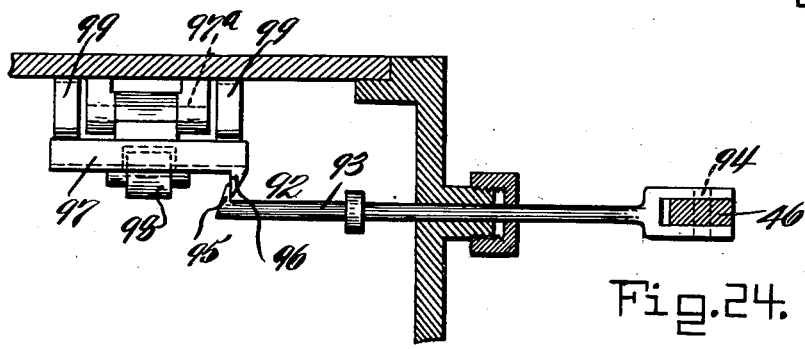

Fig. 24 is a detail, fragmentary plan view, partly in horizontal section, and further illustrating the movable, spring-tensioned block shown in Fig. 22, and the latch and some of the other connections whereby the movement of said block operates to open the clutch of the power with the driven shaft to stop the machine.

Referring now to the drawings, the machine is firmly supported by any convenient means not shown. It is inclosed in a casing, 1, preferably air-tight so as to operate, if desired, *in vacuo*, or under less than normal atmospheric pressure. A tank, 2, constitutes a reservoir for the body of liquid to be operated upon. The liquid is supplied to the reservoir through a duct 3, in which operates a "butter-fly valve" 4, hinged, or pivoted, to the duct at 5. A link 6 connects the valve 5 with a lever 7, pivoted, in this instance, at 8 to the reservoir 2, the opposite end of the lever being connected with a float 9 (Fig. 1). Thus the valve 4 is opened proportionally as the level of the liquid lowers and closed vice versa.

A vertically-elongated, cylindrical, receptacle 10 for liquid opens into and through the bottom of the reservoir. The number of said receptacles may be as desired. In the present instance, twelve, all alike, are shown alined with each other in a single rank. Each receptacle 10, I supply with a therewith concentric and coöperating vertically reciprocatable piston 11, having a therewith concentric opening 11$^a$, with which coöperates a therewith concentric vertically reciprocatable piston valve 12. Each receptacle, I further provide with a therewith concentric vertically reciprocatable valve 13 coöperating with a valve-seat 14 in an opening or outlet 14$^a$ for the liquid located in the bottom, or head, 15 of the receptacle.

The piston 11, its valve 12, and the valve 13 are each vertically reciprocatable, independently of each other, and the piston 11 and its valve 12 are downwardly movable in contact, and unison, with each other.

The downward stroke of the valve 13 prolonged to its limit closes, liquid-tight, the outlet 14$^a$, as shown in Figs. 3, 4, 5, 6 and 7, while upward movement of the valve 13 correspondingly opens said outlet. When the valve 13 is thus closed any upward movement of the piston 11, independently of its valve 12, tends correspondingly to admit the liquid, flowing by gravity solely, to contact with the bottom of the receptacle 10. Thereafter, gradual upward movement of the piston valve 12 tends to correspondingly close the opening 11$^a$ in said piston and cut-off said gravity flow. The upward stroke of the piston valve 12 is limited to terminate at a level such that the liquid content of that portion 10$^a$ (Fig. 4) of the interior of the receptacle bounded between the combined under surfaces of the piston and its therein seated valve, and the sub-extending inner surfaces of the receptacle is such as to contain a predetermined volume of the liquid, after allowing for displacement due to the therein extending portion of a hereinafter described rod carrying the valve 13.

Assuming that, to begin with, the valve 13 is at the limit of its downward stroke, and closing the outlet 14$^a$, also that the piston 11 and its valve 12 are also at the limit of their downward movement, *i. e.* both having their under surfaces in contact with the upper inner surface of the bottom of the receptacle; then the latter being above filled with the liquid, any upward movement of the piston, independently of its valve and of the valve 13, serves to unclose the opening in the piston to a flow therethrough of gravity-impelled liquid, which accordingly begins to gradually fill the predetermined space 10ª. After the piston has thus independently started on its upward stroke, its valve 12 is caused to follow it upward in unison therewith, but spaced-apart therefrom sufficiently to avoid checking said flow of the liquid through the opening in the piston. When the piston valve 12 reaches its upward limit, it stops there, and the piston, which has preceded it, is allowed to settle thereonto, whereby said opening in the piston is again closed. There is thus exactly measured, and now contained in that portion of the receptacle 10, designated by 10ª, in Fig. 4, and comprised below the then position of the piston and its valve, the desired, predetermined, volume of the liquid completely separated from the remaining body thereof. The valve 13 then rises to open the outlet of the receptacle, and the piston and its therein seated valve simultaneously begin their descent, and so continue it in unison, until the bottom of the receptacle is touched thereby, the measured charge of liquid meanwhile flowing out through the outlet 14ª and into a container C of content corresponding with said charge, and the mouth of which is in register with said outlet,—this done, the valve 13 repeats its downward stroke to again close said outlet, and the cycle of movements is repeated indefinitely.

It follows from the foregoing construction and operation, that the charge of liquid may be, during its progression, retention, measurement and delivery, subjected to no propulsive force except that of gravity, in which case no gases are forced thereinto, but, on the contrary, facilitated in escaping therefrom, whereby homogeneity and density of the charge is augmented, and precision of its measurement enhanced; also that all liquid-contacting surfaces of all parts contributing to the aforesaid measurement and manipulation of the liquid are kept constantly submerged therein, thus desirably preventing, during operation, their intermittent contact with the atmosphere or other foreign bodies; and it moreover follows that the liquid, since it merely flows by gravity, during the operations of measuring and charging, is not subjected to undesirable agitation or compression; also that the construction of the operative parts is of the simplest, most readily cleansible, and most easily and economically operatable, character.

In the case of certain liquids or semi-liquids, should greater speed than impartable by gravity be desired in the delivery of the measured charge, the piston, with its therein seated valve, may, without impairing results, be, correspondingly, mechanically forced to accelerate their aforesaid descents.

The required vertical movements are imparted to the piston and valves by any convenient means. I prefer those shown, by the drawings, as follows, viz:

The piston 11 is carried by a sleeve-spindle 16, with which it is connected by a spider, 11ᵇ, (Figs. 8 and 9). The piston-valve 12 is carried by another sleeve-spindle, 17, slidably telescoped within the sleeve, 16, and the outlet valve, 13, is carried by a rod, 18, slidably telescoped within the sleeve, 17.

The sleeve, 16, is, adjacent its upper end, connected with a vertically-reciprocatable horizontally-extended bar, 19, by means of collars 20 and 21 carried by said sleeve, (Fig. 10).

The sleeve 17 is also connected with a bar, 22, similar to the bar 19, and the rod 18 is connected with a similar bar 23.

These bars 19, 22, and 23 each carry, at each end thereof, a block, 24, slidably held in one of a pair of vertical guide-ways, 25, carried by the casing, 1, at opposite interior sides thereof, (Fig. 1). The bars thus extend the entire width of the machine and can carry, as aforesaid, as many sets of spindles and rods as required to serve the number of receptacles, 10, employed,—in the present instance, twelve.

To impart the required vertical movements to the bars 19, 22, and 23, and thus to their aforesaid therewith-connected trains of measuring and delivery elements, I provide for each respectively a rock-shaft 26, 27, and 28 (Figs. 1 and 2) carrying respectively levers 29, 30, and 31, respectively linked to the respective bars, as shown in Fig. 2. To actuate the shaft 26, the driven shaft, 33, carries a crank-arm, 32, connected by a link, 34, to an arm, 35, loosely mounted on the shaft 26. The inner end, 36, of another arm, 29ª, carried by the shaft 26, is provided with a jaw, 37, within which, with considerable free play, operates a pin, 38, on the said arm 35.

To impart the required vertical, intermittent, movements to the bar 22 by aid of which the piston-valve, 12, is actuated, the driven shaft, 33, carries a cam, 39, which actuates another arm, 30ª, carried by the rock-shaft, 27. In Fig. 2 the position of this arm, and of the arm 30, when the piston-valve is closed, as aforesaid, is indicated by dotted lines.

To impart the required vertical, intermittent, movements to the bar, 23, by aid of which the valve, 13, is actuated, the driven shaft, 33, carries a cam, 40, which actuates another arm, 31ª, carried by the rock-shaft 28.

The driven shaft, 33, carries a gear, 41, which meshes with another gear, 42, carried by the driving shaft, 43, which latter is driven by aid of a pulley, 44, operatively connectible with the shaft, 43, by a clutch mechanism, 45, the closing of which is controlled by a vibratable lever 46 pivoted to the casing 1 at 47, and having a handle 46ª. (Fig. 1).

The cams, 39, and 40, are, of course, so shaped, and timed, as to seasonably, and to the extents desired impart the respective vertical movements required to enable the valves 12 and 13 to operate as hereinbefore described.

I provide means to regulate the vertical interspace between the piston and its valve during their upward movements in unison, and also whereby the cubical content of the space comprised between the under surfaces of the piston 11 and of its valve 12 when seated, and at the limit of the latter's upward motion, and the, below-them, inner surfaces of the receptacle, 10, can be varied so as to hold and measure accurately any predetermined volume of liquid. These comprise means to adjust the limit of upward motion of the piston-valve 12, and to fix the time when it begins to ascend from its downmost position, and consist in providing the sleeve 17, carrying the piston-valve, with a threaded bushing, 49, (Fig. 10), carrying an adjusting nut, 50, and a locking nut, 51. The adjusting nut, 50, bears against a collar, 52, on said spindle, and the upper end of the threaded bushing bears against the bar, 22. To adjust the limit of upward movement of the piston-valve 12, as well as fix the time when it begins to rise relatively to the preceding ascent of the piston, the nut, 50, will be screwed up or down the sleeve 49, as may be required, and thus not only great precision insured in measurement of the charges delivered from any one receptacle, but also the charges from each of the series of receptacles can be made to correspond exactly with those from the others. It will be observed that the piston, 11, is, by reason of the free play above described between the pin, 38, and the jaw, 37, quite loosely held by its lifting means, the result being that its ultimate uppermost position is determined by that of its said valve 12—the gravity of the piston and of the superimposed liquid causing the piston to settle down upon its positively held valve and thus this construction and operation guard against untimely jamming or collision between the piston and its valve.

The upper end of the rod, 18, carrying the outlet valve 13, is provided with a projecting head 18$^a$, (Fig. 1), vertically slidable in a recess 53, in the bar 23, (Fig. 10), and is also provided with a collar 18$^b$, against which, and said bar, bears an expansile spring, 54, encircling the rod. The spring acts not only as a cushion, but also positively assists in yieldingly forcing and thereafter holding the valve 13, into its beveled seat 55, surrounding the outlet in the bottom or head 15, of the receptacle 10 (Fig. 7). The said outlet is cylindrical and extends vertically as shown. I provide the valve 13, with a downwardly projecting cylindrical extension 56, disposed to enter said outlet and slidably fill it during some of the movement of the valve toward and from its seat, 14. The extension, 56, I provide with horizontal annular circumferential recesses, 58, which act as seals in aid of preventing leakage. The extension, 56, I also provide with a terminal, downwardly projected, annular sharp edge, 59, as can be readily effected by therein boring a concentric conical cylindrical recess, 60, countersunk into the end of the extension as shown in Fig. 7. This edge should, when the valve is seated, preferably project below the lowest edge of the outlet, 14$^a$, in the bottom 15, of the receptacle, 10. This sharp edge operates desirably as a cutter to clear the said opening of thereto adhering liquid, in advance of the seating of the valve 13, and thus, also, to thereafter prevent drip. To these ends, I also provide the underside of the bottom of the receptacle, 10, with a downwardly extending relatively sharp edge 61, surrounding the nethermost orifice of the outlet, 14$^a$, as shown in Fig. 7.

The empty containers, in this instance, the usual type of cylindrical milk cans having a charging-opening in their tops, and indicated in the drawings by C, are fed, in any convenient manner, as by aid of the usual inclined runway, part of which is indicated as 62, onto a stationary horizontal table 63 (Figs. 2 and 12), upon which the cans are delivered in upright position, i. e. with the openings uppermost. I provide a frame 64, adapted to reciprocate horizontally over said table (Figs. 15, 16 and 17). This frame comprises a pusher-bar, 65, an angle-bar, 66, vertically alined therewith, and another angle-bar, 67, horizontally alined with the bar, 66. As the containers are delivered upon the table by their feed, they slide into said frame by which they are martialed, in mutual contact, into a single rank, contacting laterally with said pusher bar. The angle bars, 66, and 67, are adjustably connected with each other, at any required distance apart, in any convenient manner, as, for example, by bars 68, and 69, which are mutually slidable relatively to each other and clampable together, by any convenient means, at any desired position, this being to accommodate various diameters of the containers in different runs.

The bar, 68, carries a bracket, 70, rotatorially connected with the angle-bar, 66, in any convenient manner, as, for example, by thereby carried pivot pins 71, rotatable in bearings in brackets, 66$^a$, carried by the bar 66. Pedestals, 72, comprised in the frame 64, serve to connect the pusher-bar 65 with the angle-bar 66. The outer end of the bracket 70, carries a roller 73, shaped and disposed to strike and track with a stationary rail 74, carried by a stationary part of the machine, and thus swing up, and open, the angle bar 67 in order to enable the frame to clear the containers when it is retracted from its position indicated by dotted lines in Fig. 15. To this end the frame, 64, is slidably mounted on the table, 63, the pusher-bar, 65, being provided with runners, 75, traveling in guide slots, 76, counter-sunk in the table 63, (Figs. 15, 16, 17).

The table carries a stop, 77, (Fig. 12) to limit the movement of the rank of containers in the direction of their movement into the frame, 64, as above described.

For reciprocation of the frame, 64, comprising its pusher bar, 65, I provide a shaft, 78, (Fig. 15), carrying arms, 79, connected with said bar by links, 80, and carrying also an arm, 81, connected by a vertically reciprocatable link, 82, with an arm 83, loosely carried by the shaft, 26, (Fig. 2). The link 82 comprises two mutually telescoped elements, 84, and 85; the one, 84, being tubular and the other, 85, a therein slidable rod (Figs. 2 and 22). Adjacent its upper end the said tubular element is connected with the arm, 82, while the lower end of the rod, 85, is pivotally connected with the arm, 81, carried by the shaft, 78. The rod 85, I provide with a recess, 88, preferably annular, horizontally disposed, and angular, i. e. having its upper and lower surfaces reversely beveled, or oppositely inclined, relatively to each other as shown in Fig. 2. The tubular element, 84, is normally locked, or held, in coöperative relation with the rod, 85, of the link, 82, by a swingable latch, 86, downwardly depending by aid of gravity from a pivot, 89, carried by the tubular element 84, and having an angular nose constantly impelled by a spring to enter, and adapted to fit, and normally remain in the recess, 88, so long as the pusher-bar, 65, while advancing, encounters no abnormal resistance. When such resistance occurs, it is transmitted to downward movement of the thus composite link, 82; the nose, 87, is thereby forced out of the recess, 88, and thereafter bears idly against the cylindrical side of the rod, 82, and the entire latch 86 is thus forced to move radially outward from the rod and to so remain until the nose can reënter the recess. It is obvious that until the parts are thus reconnected, the reciprocation of the pusher-bar must cease.

My said vertically reciprocatable composite link, 82, vertically slidably supported by any convenient guides (not shown) is actuated by aid of a cam, 90, carried by the driven shaft, 33, and which bears against a roller, 84ª, carried by the tubular element 84 of the link.

It is preferable that other operations of my machine should also be suspended during the above-described stoppage of the movements of the pusher-bar. To this end, I have provided the hereinbefore referred to clutch mechanism 45, (Fig. 1), which may be of any preferred type, but in this instance is indicated in the drawings as of the well known form embodying a cone-shaped member, 43ª, horizontally-slidably carried on the power shaft, 43, and which when forced between and against the thereto opposed arms, 43ᵇ, of a group of bell-crank levers carried by said shaft causes the opposite arms of said levers to bear against the interior surface of a ring 44ª within the pulley, 44, and with sufficient friction to cause the shaft to rotate. The retractable clutch-closing lever, 46, is operatively connected with the cone-shaped member, 43ª, in the usual manner as indicated in Fig. 1. A retractile spring, 91, connects the lever with the stationary casing, 1; and thus tends constantly to open the clutch. To keep the clutch closed against the stress of said spring, I provide a latching device, 92, (Figs. 1 and 24), comprising a latch-rod, 93, the outer end of which is pivotally connected with the lever, 46, as indicated at 94, and the inner end of which carries a nose, 95, which engages a keeper, 96, carried by an oscillatable keeper-member, 97, which, at its inner or lower end, is pivoted as at 97ª to the stationary casing, 1. (Fig. 2). The keeper-member carries a roller, 98, which bears against the latch, 86, carried by the tubular element, 84, of the before described composite link, 82, and is normally, constantly, kept in contact therewith by leaf springs, 99. The operation is such that when the latch, 86, is forced, as aforesaid, out of normal position, it is caused to bear against the keeper-member and thereby opens the latching device, 92, whereupon the lever, 46, is released to the action of the spring, 91, the clutch, 45, is opened and the power shaft, 43, ceases to rotate.

The casing, 1, is provided with any convenient opening, or hand-hole, 100, (Fig. 2), affording access, when required, to the interior, and normally closed by any convenient type of cover, 101, which, if reduced air pressures are employed will, of course, be hermetically sealable.

After any cause of the abnormal resistance to the pusher-bar has been corrected, as, for example, by the operator's release of a jammed container, or the like, the parts are, by him readily restored to their normal operative positions and relations, the lever, 46, being, in aid of this, provided with the handle 46ª, and the operation of the machine is then resumed.

On the other hand, I also provide means to prevent the advance of the pusher-bar 65 until such time as the feed has advanced into the frame, 64, and in front of the pusher-bar, the full quota of containers (twelve in this instance) required to serve the twelve charges of liquid thereof measured and held in the receptacles, 10, as previously described. These means comprise a latch, 102, (Fig. 21) engaging the pusher-bar, 65, carried oscillatably and slidably over the stop 77, by the pivot, 103, carried by the table 63; the latch being normally kept in engagement with the pusher-bar by the spring, 104. The pusher-bar thus remains locked until the advance of a full quota of containers pushes its endmost unit very nearly to contact with the stop, at which moment it presses against the latch, 102, sufficiently to swing it free of the pusher-bar. The latter, in returning to its original position after having advanced the rank of containers, contacts with the latch to swing it and is again automatically locked thereby until again released, as aforesaid. It will be observed that any undue delay in supplying the full quota of cans as aforesaid will also operate to stop the machine, since the resistance to the advance of the pusher-bar thus caused by the latch, 102, serves to open the latch, 86, and to cut off the power as hereinbefore described.

In absence of the described, or other, undue resistances to its advance, the pusher-bar will push the rank of containers forward as far as to the position indicated by $C^a$ in Fig. 12, where their openings, will be in longitudinal alinement with, and below, the row of outlets of the receptacles 10.

To accommodate respective runs of larger or smaller containers, I provide means whereby they are also transversely moved, during their said advance so that the opening of each container may, at the end of its forward movement, be exactly centered respectively with the outlet of one of the receptacles. These means comprise a set of equally wide spacing-guide-bars, 105, carrying pins, 106, fitting, and removably held, in openings, 107, in the table 63 (Figs. 12 and 20). The width of the bars of each set is made to accommodate the horizontal diameters of different runs of containers and the construction is such that the sets are readily interchangeable, the width of the bars being inversely proportional to the horizontal diameters of the containers as shown in Fig. 12 when compared with Fig. 18, the containers of the former being smaller and the bars correspondingly wider than the bars $105^b$ of Fig. 18. The units of the rank of containers are, when the pusher-bar 65 begins its advance, in contact with each other. As the advance proceeds, the central bar, $105^a$, (Fig. 12) being longer than its associates, is first reached by the center of the rank, and the two midmost containers are thereby parted and moved, or elbowed, transversely and respectively toward the right and the left. These transverse movements are transmitted to the remaining units ranged farther to right and left respectively, the effect being as shown by dotted lines in Fig. 12. To facilitate the separation of the two midmost containers, the outer end of the central bar, $105^a$, is beveled on both sides, as shown. As the containers further advance, the two midmost containers are likewise separated from their therewith contacting containers, on right and left,—on reaching the next two bars, which are alike in length and both shorter than the bar $105^a$, and the ends of which are severally respectively beveled, the one on its right side, and the other on its left side, as shown. The remaining pairs of bars are progressively shorter and likewise beveled respectively to right and left, as shown in Fig. 12. The construction is such that by the time the pusher bar, 65, has reached the limit of its advance, each container will have been moved not only forward by the pusher-bar, but also transversely by contact with a spacer-guide-bar, and into a position in which its opening centers with one of the outlets of the receptacles. To prevent the endmost container, $C^b$, (Fig. 12) from escaping the impulsion of the pusher-bar 65 during its advance, I provide that bar with a movable extension, 108, slidably mounted therein (Fig. 12) in any convenient manner, in this instance by carrying a pin, 109, passing through a slot $109^a$ indicated by dotted lines (Figs. 12, 14, 16, 17) in the bar 65 and engaging a cam-slot, 110, in the table, 63, the slot being conformed, as shown, to hold the extension in normal position until it has passed the endmost unit $C^c$ (Fig. 12) of the remaining infeeding containers, and thereafter to progressively project the extension in constant accompaniment of the endmost container, $C^b$, during the latter's above described transverse movement toward the left.

To stop the advance of the in-feeding containers, headed by the container $C^c$, during the above described movements of the pusher-bar, 65, I provide an intermittently reciprocatable stop (Figs. 12, 13 and 14) comprising a block, 111, slidably held in a guide-piece, 112, secured to the table, 63, and operated by a lever, 113, pivoted, at 114, to said table. This lever has secured thereto, at 115, a slide, 116, having a slot, 117, through which extends slidably a screw-pin, 118, secured in said table. The construction and disposition of these elements is such that when the pusher-bar, 65, has been retracted to its normal, immobile, position, it will, as shown in Fig. 12, have pushed the slide, 116, back, which will operate to correspondingly swing the lever, 113, and thus retract and hold the block, 111, out of the path of the infeeding container; while, when the pusher-bar advances, thus releasing the slide, 116, a spring, 119, supported, disposed, and tensioned, to bear against the lever, 113, will cause the latter to advance the block, 111, into the path of the in-feding containers and thus hold back the container C⁰ and its followers, until the pusher-bar has been restored to its normal inactive position, in which it is temporarily locked by the latch, 102, as previously described.

It will be understood that, in the present instance, inasmuch as the spacer-guide-bars are located upon the table 63, the pusher-bar is provided with therein underneath countersunk grooves 121 (Fig. 16) sufficiently deep, and wide, to enable it to straddle the spacer-bars during its movements.

I provide means to arrest the operation of the machine whenever the supply of liquid in the tank or reservoir, 2, becomes insufficient. These comprise a latching-lever 123 (Fig. 23) pivoted, at 124, to a bracket 124ª carried by the floor, 63. The outer end of this lever is connected with the float 9 by a cable, 125, passing over pulleys, 126, and 127. The inner end of the latch carries a nose, 128, disposed to engage with and lock the pusher-bar, 65, whenever the liquid in the reservoir lowers below a predetermined level, thus throwing out the latch 86 and opening the clutch 45 as hereinbefore described. An expansile spring, 124ᵇ, functions to normally lift and hold the latch clear of the pusher-bar 65.

When the larger sizes of containers, indicated by C⁴ in Fig. 18, are being run, I find it preferable to modify, as shown in Fig. 18, the arrangement of the spacer-guide-bars shown in Fig. 12. In this instance, the set of narrower, spacer-bars, 105ᵇ, shown in Fig. 18, is arranged and conformed so as to elbow all the containers from right to left during their forward movement, thus, on the right, an endmost guide-bar, 105ᶜ, being longer and wider than any of the group of spacer-guide-bars, and having its end beveled only on the left side, causes the entire rank of mutually-contacting containers to, as they advance, move toward the left. As the pusher-bar, 65, further advances, the longest of the spacer-guide-bars, 105ᵈ, is next encountered by the containers, and serves to separate the endmost can, on the right, from its therewith contacting neighbor, on the left, and, the end of the bar 105ᵈ being beveled only on the left, to elbow that neighbor and with it the remainder of the rank toward the left. The remaining bars, each being shorter than its neighbor on the right and similarly beveled, operate similarly to progressively separate and move toward the left the remaining units of the rank of containers.

When the openings of the containers have, as above described, been centered with the outlets of the receptacles, 10, the construction is such that the outlet valves, 13, are simultaneously opened and the measured liquid is either allowed to flow by gravity, or is, if required, forced into the containers.

The thus charged cans are, by the next advancing rank of empty cans, pushed forward onto a traveling belt, 129, (Figs. 1, 2 and 12) which conveys them to where desired. A pan, 130, (Fig. 1) may be provided to receive any drippings.

Should it be desired, as may be sometimes preferable, to operate my machine under reduced atmospheric pressure, the casing will be constructed, in any convenient manner, so as to be closable airtight, and any usual convenient form of air-exhausting apparatus is combined therewith so as to create and maintain the desired reduction of atmospheric pressure within the casing. The plan of construction and operation of my liquid-measuring and container-charging devices hereinbefore described is such that they are operative *in vacuo*, which is a very important and useful feature of my invention, but for many, or most, purposes my machine operates equally satisfactorily under normal atmospheric pressure.

Having now described my invention, what I claim as new and desire to secure by Letters Patent, is the following, viz.:

1. In a liquid-measuring, container-charging, machine, a vertically elongated receptacle for the liquid having through the bottom thereof an outlet therefor; a vertically reciprocatable valve coöperating with said outlet; a vertically reciprocatable piston coöperating with said receptacle and having an opening for the liquid; a piston valve, coöperating with said opening, vertically reciprocatable between said piston and said opening; means to lift and lower said piston independently of said piston valve, to lift said piston valve to a predetermined position independently of said piston and to lower said piston and piston valve in unison; and means to reciprocate said first mentioned valve independently of said piston and piston valve.

2. In a liquid-measuring, container-charging, machine, a receptacle for the liquid having an outlet therefor; a valve coöperating with said outlet; a reciprocatable piston coöperating with said receptacle and having an opening for the liquid; a piston valve coöperating with said opening and reciprocatable between said piston and said outlet; means to reciprocate said piston independently of said valve; and means to move said valve toward said piston, to maintain it stationary at a predetermined point, and to permit its moving in unison with said piston toward said outlet.

3. In a liquid-measuring, container-charging, machine, a receptacle for the liquid having an outlet therefor; a valve coöperating with said outlet; a vertically reciprocatable piston coöperating with said receptacle and having an opening for the liquid; a vertically reciprocatable piston valve disposed underneath said piston and coöperating with said opening; means to raise and lower said piston independently of said piston valve; means to raise said piston valve to, and maintain it stationary at, a predetermined height independently of, and to lower it in unison with, said piston; and means to open and close said first mentioned valve independently of said piston and piston valve.

4. In a liquid-measuring, container-charging, machine, a vertically elongated receptacle for the liquid, having through the bottom thereof a therewith concentric outlet therefor; a vertically reciprocatable valve coöperating with said outlet; a vertically reciprocatable piston concentric and coöperating with said receptacle, and having a therewith concentric opening for the liquid; a vertically reciprocatable piston-valve concentric therewith coöperating with said opening, and means comprising connections mutually-concentric with each other and with said cylinder to intermittently reciprocate said valves and said piston independently of each other.

5. In a liquid-measuring, container-charging, machine, a reservoir for the liquid; disposed below said reservoir a plurality of vertically elongated cylindrical receptacles for liquid opening into and through the bottom of said reservoir, and each having through the bottom thereof an outlet for the liquid; a vertically reciprocatable valve coöperating with each said outlet; a vertically reciprocatable piston coöperating with each said receptacle and having an opening for the liquid; a vertically reciprocatable valve coöperating with each said opening; means to intermittently reciprocate simultaneously the members of each plurality of said valves, independently of the other plurality of said valves, and of said pistons; and means to intermittently reciprocate simultaneously the said pistons independently of said valves.

6. The combination of a power shaft, a driving shaft, a clutch normally operatively connecting said shafts; a table; a bar reciprocatable horizontally over said table and adapted to bear against thereon articles in its path to move them toward predetermined locations on said table; means, normally operatively connected with said driving shaft to reciprocate said bar, and comprising a vertically reciprocatable link composed of two mutually-telescoped elements, the one having a recess, the other carrying a swingable latch normally coöperating with said recess to, by aid of gravity, interlock said elements; adjacent said latch, an oscillatable keeper member disposed to be moved by said latch when the latter is forced out of said recess by an abnormal resistance to the advance of said bar; and means, connected with said keeper member and with said clutch, to open the latter when said keeper member is so moved.

BURT E. TAYLOR.

Witnesses:
PHILIP C. PECK,
WILLIAM C. MAUGNER.